Feb. 28, 1950     T. L. CUBBAGE     2,498,794
REMOVAL OF MAGNETIC MATERIAL FROM FURFURAL
Filed June 22, 1945

INVENTOR
T. L. CUBBAGE
BY *Hudson & Young*
ATTORNEYS

Patented Feb. 28, 1950

2,498,794

UNITED STATES PATENT OFFICE 2,498,794

REMOVAL OF MAGNETIC MATERIAL FROM FURFURAL

Thomas L. Cubbage, Borger, Tex., assignor to Phillips Petroleum Company, a corporation of Delaware Application June 22, 1945, Serial No. 600,876

4 Claims. (Cl. 202—39.5)

This invention relates to the prevention of polymerization of furfural in plant processes, from a hitherto unsuspected cause. In one particular aspect it relates to the discovery of a cause of furfural polymerization in plant practice. In another particular aspect it relates to the removal of such cause, thereby decreasing the rate of polymerization of furfural.

Furfural is widely used as a selective solvent for the extraction or concentration of unsaturated hydrocarbons from hydrocarbon streams containing both saturated and unsaturated hydrocarbons and especially for the concentration or extraction of butylenes and/or butadiene from aliphatic C₄ hydrocarbon streams. A principal disadvantage to the use of furfural for this purpose lies in the formation of furfural polymers. The conditions causing the formation of these polymers are not completely understood but heat, pressure, moisture, the presence of air or oxygen, the presence of hydrocarbons, especially olefins or diolefins are conducive to their formation. As the concentration of furfural polymers builds up in furfural used in extractive distillation plants the selectivity of the solvent is reduced. The boiling point of the furfural is also increased. The polymer coats the surfaces of the equipment interfering with heat transfer, causing coking on heating coils or elements, plugging, and other difficulties. Furthermore furfural polymer in high concentration catalyzes the formation of furfural polymers. It is necessary in the operation of extractive distillation plants to remove the polymer from the furfural solvent at some stage of the operation or to discard the used furfural. It is believed that any process which would decrease polymer formation would find immediate use in the art because it would make the process more economical.

One object of my invention is to provide a method for decreasing the polymerization of furfural.

Another object of my invention is to provide an apparatus for putting the method taught into practical use.

Figure 1:
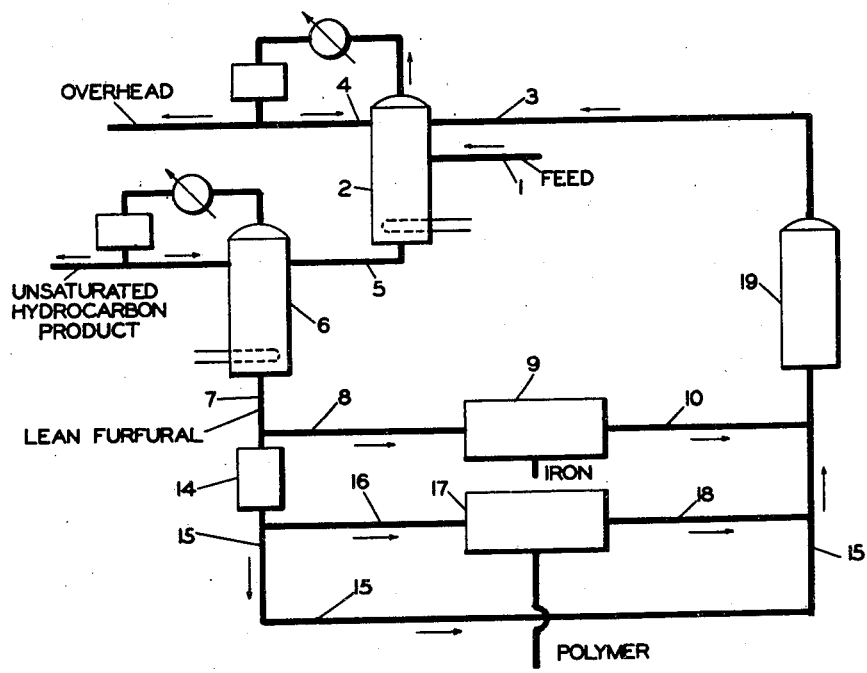

In the accompanying drawings:

Figure 1 portrays diagrammatically one way in which the present invention may be applied to a conventional furfural extractive distillation system.

Figure 2:
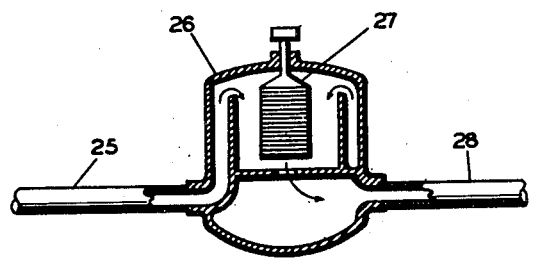

Figure 2 shows one form of the present invention in which the iron removal unit consists of a magnetic separator.

I have discovered that minute quantities of bright iron particles circulating in the process streams in such plants exert catalytic effect, greatly increasing the rate of polymerization of furfural. These bright iron particles apparently originate as chips broken or abraded from various parts of the equipment, and since the reaction of the furfural is acid these bright particles do not become coated with catalytically inactive oxides as they circulate in the process stream but remain bright and continue to exert catalytic effect.

It has long been known in the art that furfural in circulating process streams frequently carries considerable quantities of iron rust or other oxides, but as these oxides do not exert catalytic effect it has not been customary to remove them unless the quantity present became so great as to exert abrasive or clogging action on pumps or other apparatus. It was entirely unsuspected that minute quantities of bright iron particles were present and exerting catalytic effect to increase the rate of furfural polymerization.

My invention consists first, in the discovery that the rate of polymerization of furfural in such process streams was increased by the catalytic effect of the minute quantities of bright iron particles and other magnetic materials present; and second, in providing a suitable means for the removal of the iron particles and other magnetic materials from such process streams. The iron particles and other magnetic materials may be removed from the process stream by filtration, settling and decantation, centrifuging or any other suitable means but I prefer to use a magnetic separator for their removal. One embodiment of my invention is illustrated in the accompanying drawings.

In Figure 1 the aliphatic hydrocarbon feed containing unsaturated hydrocarbons to be separated therefrom enters furfural extractive distillation column 2 via line 1. Column 2 is operated in the conventional manner, lean furfural solvent being introduced at the top via line 3 just below the reflux entry line 4. Column 2 is provided with the usual reboiler at the bottom and the usual means for condensing and accumulating overhead for reflux and product. The rich furfural leaves via line 5 and is fed into the stripper column 6, which is similarly provided with reboiler and refluxing means. Lean furfural leaves the bottom of the stripper column 6 via line 7, where the stream is branched and a suitable portion is conducted by line 8 to the metallic iron removal unit 9, in which the particles of iron and other magnetic materials are removed. The removal unit 9 operates in conventional manner and separates the iron from the furfural either by filtration, sedimentation and decantation, centrifuging, magnetic separation or any other conventional manner. The cleaned furfural is then returned to the main process stream 15 via line 10.

That portion of the lean furfural stream in line 7 which is not removed by line 8 is passed through a cooler 14 where it is cooled and passed into line 15. A portion of the furfural in line 15 is withdrawn via a branch line 16 and fed to the furfural rerun unit 17 where said furfural is evaporated to free it from the polymers present and is returned to line 15 via line 18. Line 15 conducts the furfural to the surge tank 19, from whence it is recycled via line 3 to the absorber 2.

Figure 2 illustrates diagrammatically a preferred type of metallic iron separation unit which may be used in one embodiment of applicant's invention. Furfural enters a housing 26 via line 25 and is passed over a magnetic separator 27, of conventional design, which removes the iron and other magnetic material present. The cleaned furfural is returned to the main process stream via line 28.

It is understood that the magnetic separator may be mounted in the main process line or in a bypass; that said separator may be either of the induction or permanent magnet types; that a plurality of such separators may be used; that said separator may be designed to run continuously with an automatic demagnetizing and cleaning device or with two units installed so that one will be on stream while the other is down for cleaning without departing from the spirit of the invention.

Operation

In operation the lean furfural stream from the bottom of the stripping column 6 in Figure 1 is branched and a portion is passed to the metallic iron separating unit before cooling because the viscosity of the furfural is lower at elevated temperatures and the efficiency of the removal unit is thereby increased. Although the metallic iron removal unit will operate at any temperature at which furfural will flow, I prefer to operate it at temperatures in the range of 200° F. to 350° F. The quantities of furfural withdrawn from the main furfural stream and passed through the metallic iron removal unit are so regulated that the metallic iron content of the furfural in the main stream entering the furfural surge tank 19 in Figure 1 is maintained at not more than 0.001 weight per cent. Quantities of metallic iron particles less than 0.001 weight per cent have not been found to exert measurable catalytic effect on furfural polymerization.

Example

In the manufacture of butadiene an extractive distillation system as shown in Figure 1 was employed to separate a mixture of butadiene and butene-2 from a $C_4$ hydrocarbon stream containing same in admixture with other aliphatic $C_4$ hydrocarbons including butene-1 and normal butane. Furfural was fed continuously into the absorber 2 at a rate of 130,000 gallons per hour. This furfural contained approximately 6 weight per cent of water, and had a polymer content of 0.5 per cent. The total furfural content of the system was 120,000 gallons. Side streams taken off the furfural line from the stripper 6 delivered 1,000 gallons of furfural per hour to the iron removal unit and 1,800 gallons per hour to the furfural rerun unit. Magnetic material was removed from the furfural stream at the rate of 8 oz. per hour in the metallic iron removal unit and almost all of the magnetic material consisted of metallic iron particles. Under such conditions the furfural had reached equilibrium between polymer formation and polymer removal. Without the iron removal unit in operation the polymer formation became so much higher that a considerably larger stream had to be passed to the rerun unit in order to keep the polymer concentration in the furfural in the extractive distillation system at about the same level, namely 0.5 per cent, and this entailed a correspondingly larger loss of furfural as polymer.

No attempt was made to remove the iron rust or other non-magnetic materials as these do not catalyze the polymerization of furfural.

I claim:

1. A process for the separation of an unsaturated hydrocarbon material from a hydrocarbon mixture containing the same in admixture with a more saturated hydrocarbon material, comprising the following steps: subjecting said hydrocarbon mixture to extractive distillation with furfural as selective solvent; withdrawing furfural containing dissolved unsaturated hydrocarbon from said extractive distillation, and introducing said furfural into a stripping zone wherein said furfural is stripped of dissolved unsaturated hydrocarbon; withdrawing stripped furfural from said stripping zone, and dividing said furfural into two portions; evaporating furfural from said first portion to purify same and passing resulting purified furfural to said distillation; separating from said second portion iron impurities picked up in the system used to carry out the process, thereby decreasing polymerization of furfural in the extractive distillation system; passing resulting furfural free of said iron impurities back to said extractive distillation.

2. A process for the separation of butadiene from a hydrocarbon mixture containing the same in admixture with more saturated hydrocarbons, comprising the following steps: subjecting said hydrocarbon mixture to extractive distillation with furfural as selective solvent; withdrawing furfural containing dissolved butadiene from said extractive distillation, and introducing said furfural into a stripping zone wherein said furfural is stripped of dissolved butadiene; withdrawing stripped furfural from said stripping zone, and dividing said furfural into two portions; evaporating furfural from said first portion to purify same and passing resulting purified furfural to said distillation; magnetically separating from said second portion iron particles picked up in the system used to carry out the process, thereby decreasing polymerization of furfural in the extractive distillation system; passing the furfural free of said magnetic impurities back to said extractive distillation.

3. A process for the separation of an unsaturated hydrocarbon from a hydrocarbon mixture containing the same in admixture with a more saturated hydrocarbon, comprising the following steps: subjecting said hydrocarbon mixture to extractive distillation with furfural as selective solvent; withdrawing furfural containing dissolved unsaturated hydrocarbon from said extractive distillation and introducing said furfural into a stripping zone wherein said furfural is stripped of dissolved unsaturated hydrocarbon; withdrawing stripped furfural from said stripping zone and dividing said furfural into two portions; evaporating furfural from said first portion to purify same and passing resulting purified furfural to said distillation; magnetically separating iron particles from said second portion of furfural at a temperature of 200–350° F. in an amount such as to prevent concentration of said particles in furfural recirculated to said extractive distillation from exceeding 0.001 per cent by weight, thereby decreasing polymerization of furfural in the system, and recirculating resulting furfural to said extractive distillation.

4. A process for the separation of a mixture of butadiene and butene-2 from a $C_4$ hydrocarbon stream containing same in admixture with other aliphatic $C_4$ hydrocarbons including butene-1 and normal butane, which comprises: subjecting said $C_4$ hydrocarbon stream to extractive distillation with furfural as selective solvent; withdrawing furfural containing dissolved butadiene and butene-2 from said extractive distillation and introducing same into a stripping zone wherein said furfural is stripped of dissolved butadiene and butene-2; withdrawing stripped furfural from said stripping zone and dividing said furfural into two portions; evaporating furfural from said first portion to purify same and passing resulting purified furfural to said distillation; magnetically separating iron particles from said second portion of furfural at a temperature of 200–350° F. in an amount such as to prevent concentration of said particles in furfural recirculated to said extractive distillation from exceeding 0.001 per cent by weight, thereby decreasing polymerization of furfural in the system, and recirculating resulting furfural to said extractive distillation.

THOMAS L. CUBBAGE.

REFERENCES CITED

The following references are of record in the file of this patent:

UNITED STATES PATENTS

| Number | Name | Date |
|---|---|---|
| 2,236,769 | Armbruster | Apr. 1, 1941 |
| 2,350,609 | Hackmuth | June 6, 1944 |

OTHER REFERENCES

Dunlop et al., "Thermal Stability of Furfural," Industrial and Engineering Chemistry, vol. 32, pp. 1639–1641 (1940).